(12) United States Patent
Shang et al.

(10) Patent No.: US 11,385,822 B2
(45) Date of Patent: Jul. 12, 2022

(54) MOVING DATA FROM A FIRST GROUP OF SLICES TO A SECOND GROUP OF SLICES

(71) Applicant: EMC IP Holding Company LLC, Hopkinton, MA (US)

(72) Inventors: Rongrong Shang, Beijing (CN); Haiying Tang, Beijing (CN); Xiaobo Zhang, Beijing (CN); Shuai Ni, Beijing (CN); Changrui Shao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 110 days.

(21) Appl. No.: 16/845,263

(22) Filed: Apr. 10, 2020

(65) Prior Publication Data

US 2021/0034276 A1    Feb. 4, 2021

(30) Foreign Application Priority Data

Jul. 31, 2019  (CN) .......................... 201910701451.0

(51) Int. Cl.
*G06F 3/06* (2006.01)

(52) U.S. Cl.
CPC .......... *G06F 3/0647* (2013.01); *G06F 3/0604* (2013.01); *G06F 3/0673* (2013.01)

(58) Field of Classification Search
CPC ..... G06F 3/0647; G06F 3/0673; G06F 3/0604
See application file for complete search history.

(56) References Cited

U.S. PATENT DOCUMENTS

| 5,345,584 A | 9/1994 | Hill |
| 5,734,861 A | 3/1998 | Cohn et al. |
| 6,173,306 B1 | 1/2001 | Raz et al. |
| 8,583,838 B1 | 11/2013 | Marshak et al. |
| 8,706,960 B1 | 4/2014 | Ives et al. |
| 8,935,493 B1 | 1/2015 | Dolan et al. |

(Continued)

FOREIGN PATENT DOCUMENTS

| RU | 2235356 | 8/2004 |
| WO | 20160072971 | 5/2016 |
| WO | 2019022631 | 1/2019 |

OTHER PUBLICATIONS

EMC, "EMC Celerra Automated Storage Tiering Applied Best Practices Guide", Aug. 2009, P/N h6499, pp. 1-36.

(Continued)

*Primary Examiner* — Michelle T Bechtold
(74) *Attorney, Agent, or Firm* — BainwoodHuang (57) ABSTRACT

Techniques for processing data involve: receiving a request for moving data from a first slice group in a first logical unit to a second logical unit; determining, based on the request, a second slice group from the second logical unit, the size of the second slice group being larger than or equal to the size of the first slice group; and moving data in the first slice group into the second slice group. Such techniques enable moving data into slices in a specified address range in a specified logical unit, moving data into appropriate slices in a target logical unit when data cannot be moved to slices in a specific address range because an address range is not specified or a specified address range is unavailable can be achieved, and moving disk extents (DEs) by a Redundant Array of Multi-Core Disks (MCR) and redistributing IOs between disk extents.

19 Claims, 6 Drawing Sheets

(56) References Cited

U.S. PATENT DOCUMENTS

| | | |
|---|---|---|
| 8,949,483 B1 | 2/2015 | Martin |
| 8,976,636 B1 | 3/2015 | Martin et al. |
| 9,047,017 B1 | 6/2015 | Dolan et al. |
| 9,052,830 B1 | 6/2015 | Marshak et al. |
| 9,256,381 B1 | 2/2016 | Fultz et al. |
| 9,311,002 B1 | 4/2016 | Scott et al. |
| 9,330,105 B1 | 5/2016 | Duprey et al. |
| 9,354,813 B1 | 5/2016 | Dolan et al. |
| 9,378,136 B1 | 6/2016 | Martin |
| 9,383,940 B1 | 7/2016 | Ives et al. |
| 9,477,407 B1 | 10/2016 | Marshak et al. |
| 9,507,887 B1 | 11/2016 | Wang et al. |
| 9,594,514 B1 | 3/2017 | Bono et al. |
| 9,665,288 B1 | 5/2017 | Aharoni et al. |
| 9,665,630 B1 | 5/2017 | Bigman et al. |
| 9,684,593 B1 | 6/2017 | Chen et al. |
| 9,703,664 B1 | 7/2017 | Alshawabkeh et al. |
| 9,898,224 B1 | 2/2018 | Marshak et al. |
| 9,940,033 B1 | 4/2018 | Alshawabkeh et al. |
| 9,965,218 B1 | 5/2018 | Martin et al. |
| 10,013,170 B1 | 7/2018 | Sahin et al. |
| 10,025,523 B1 | 7/2018 | Dagan et al. |
| 10,073,621 B1 | 9/2018 | Foley et al. |
| 10,078,569 B1 | 9/2018 | Alshawabkeh et al. |
| 10,089,026 B1 | 10/2018 | Puhov et al. |
| 10,095,425 B1 | 10/2018 | Martin |
| 10,126,988 B1 | 11/2018 | Han et al. |
| 10,140,041 B1 | 11/2018 | Dong et al. |
| 10,146,447 B1 | 12/2018 | Dong et al. |
| 10,146,456 B1 | 12/2018 | Gao et al. |
| 10,146,459 B1 | 12/2018 | Gao et al. |
| 10,146,624 B1 | 12/2018 | Gong et al. |
| 10,146,646 B1 | 12/2018 | Foley et al. |
| 10,152,254 B1 | 12/2018 | Kang et al. |
| 10,254,970 B1 | 4/2019 | Martin et al. |
| 10,261,717 B1 | 4/2019 | Martin et al. |
| 10,282,107 B1 | 5/2019 | Martin et al. |
| 10,338,825 B2 | 7/2019 | Dalmatov |
| 10,466,901 B1 | 11/2019 | Labaj et al. |
| 10,521,124 B1 | 12/2019 | Aharoni et al. |
| 10,664,165 B1 | 5/2020 | Faibish et al. |
| 10,754,573 B2 | 8/2020 | Dalmatov et al. |
| 10,809,931 B1 | 10/2020 | Martin et al. |
| 10,891,057 B1 | 1/2021 | O&apos et al. |
| 11,061,814 B1 | 7/2021 | O&apos et al. |
| 2002/0095532 A1 | 7/2002 | Surugucchi et al. |
| 2003/0065883 A1 | 4/2003 | Bachmat |
| 2006/0161807 A1 | 7/2006 | Dawkins |
| 2006/0212746 A1 | 9/2006 | Amegadzie et al. |
| 2008/0028164 A1 | 1/2008 | Ikemoto et al. |
| 2008/0059749 A1 | 3/2008 | Gerber et al. |
| 2008/0109601 A1 | 5/2008 | Klemm et al. |
| 2010/0250501 A1 | 9/2010 | Mandagere et al. |
| 2012/0259901 A1 | 10/2012 | Lee et al. |
| 2013/0179657 A1 | 7/2013 | Isomura et al. |
| 2013/0275653 A1 | 10/2013 | Ranade et al. |
| 2014/0019579 A1* | 1/2014 | Motwani ............... G06F 3/0614 709/216 |
| 2014/0040205 A1* | 2/2014 | Cometto ............... G06F 9/4411 707/639 |
| 2014/0082310 A1 | 3/2014 | Nakajima |
| 2014/0095439 A1 | 4/2014 | Ram |
| 2014/0325121 A1 | 10/2014 | Akutsu et al. |
| 2014/0325262 A1 | 10/2014 | Cooper et al. |
| 2015/0134926 A1 | 5/2015 | Yang et al. |
| 2016/0188401 A1 | 6/2016 | Shen et al. |
| 2016/0342364 A1 | 11/2016 | Ono |
| 2016/0350021 A1 | 12/2016 | Matsushita et al. |
| 2016/0364149 A1 | 12/2016 | Klemm et al. |
| 2017/0285972 A1 | 10/2017 | Dalmatov |
| 2017/0285973 A1 | 10/2017 | Dalmatov |
| 2018/0157437 A1* | 6/2018 | Sandberg ............ G06F 12/1027 |

OTHER PUBLICATIONS

EMC, "EMC VNX@ Unified Best Practices for Performance Applied Best Practice Guide", Oct. 2005, P/N H10938.8, pp. 1-37.

EMC, "Managing Data Relocation in Storage Systems", U.S. Appl. No. 13/929,664, filed Jun. 27, 2013.

International Search Report and the Written Opinion from International Searching Authority (RU) for International Application No. PCT/RU2017/000556, dated Mar. 29, 2018, 9 pages.

Tomek, "EMC VNX-Fast VP Explained—Storage Freak", retrieved from http://www.storagefreak.net/2014/06/emc-vnx-fast-vp-explained, Jun. 2, 2014, pp. 1-6.

* cited by examiner

MOVING DATA FROM A FIRST GROUP OF SLICES TO A SECOND GROUP OF SLICES

CROSS-REFERENCE TO RELATED APPLICATION

This application claims priority to Chinese Patent Application No. CN201910701451.0, on file at the China National Intellectual Property Administration (CNIPA), having a filing date of Jul. 31, 2019, and having "A METHOD, A DEVICE, AND A COMPUTER PROGRAM PRODUCT FOR PROCESSING DATA" as a title, the contents and teachings of which are herein incorporated by reference in their entirety.

FIELD

Embodiments of the present disclosure generally relate to the data processing field, and more specifically, to a method, a device, and a computer program product for processing data.

BACKGROUND

A virtual logical unit can map data from a thin logical unit (TLU) to a logical unit (LU). While creating a thin logical unit, an initial allocation storage capacity may be set. After the thin logical unit is created, storage space only with this initial allocation storage capacity will be allocated, and the remaining storage space is still retained at a storage pool. When the usage rate of the storage space allocated to the thin logical unit amounts to a threshold, a storage system may continue to allocate given storage space to the thin logical unit from the storage pool, and so forth, until the full storage capacity which is initially set for the thin logical unit is reached.

Therefore, storage space in the thin logical unit has a higher usage rate. Storage space in the logical unit is divided in units of slices, wherein a slice may be deemed as contiguous storage space in the logical unit. A slice where data is stored may be reused by reallocating data.

SUMMARY

Embodiments of the present disclosure provide a method, device and computer program product for processing data.

In a first aspect of the present disclosure, provided is a method for processing data. The method includes: receiving a request for moving data from a first group of slices in a first logical unit to a second logical unit; determining, based on the request, a second group of slices from the second logical unit, the size of the second group of slices being larger than (or greater than) or equal to the size of the first group of slices; and moving data in the first group of slices into the second group of slices.

In a second aspect of the present disclosure, provided is a device for processing data. The device includes: at least one processing unit; at least one memory, coupled to the at least one processing unit and storing instructions executed by the at least one processing unit, the instructions, when executed by the at least one processing unit, causing the device to perform acts, including: receiving a request for moving data from a first group of slices in a first logical unit to a second logical unit; determining, based on the request, a second group of slices from the second logical unit, the size of the second group of slices being larger than or equal to the size of the first group of slices; and moving data in the first group of slices into the second group of slices.

In a third aspect of the present disclosure, provided is a computer program product. The computer program product is tangibly stored on a non-transient computer readable medium and includes machine executable instructions which, when being executed, cause a machine to perform any step of a method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Some preferable embodiments will be described in more detail with reference to the accompanying drawings, in which the preferable embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

Traditional data storage solutions do not support some slices in a logical unit to move data to other slices in a specified address range in the same or another logical unit, i.e. do not support relocation of slices. As a result, slices in the logical unit have a lower usage rate.

In order to at least partly solve one or more of the above and other potential problems, embodiments of the present disclosure propose a solution for relocating slices in one or more logical units. With the solution, data may be moved to slices in a specified address range in a specified logical unit, wherein the address range is defined as start offset and length of the address range in the logical unit.

Figure 1:
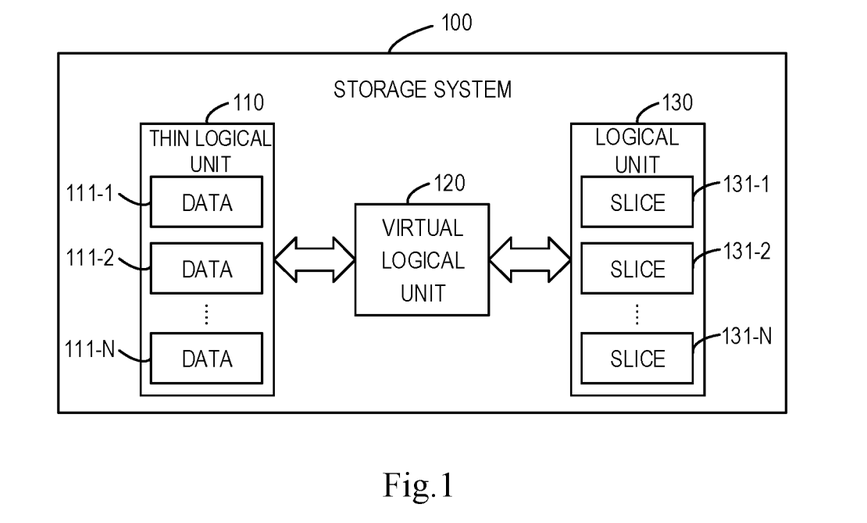
FIG. 1 shows a schematic view of a storage system 100 in which some embodiments of the present disclosure may be implemented.

FIG. 1 shows a schematic view of a storage system 100 in which some embodiments of the present disclosure can be implemented. The storage system 100 includes a thin logical unit 110, a virtual logical unit 120 and a logical unit 130. It is noteworthy the storage system 100 may include more logical units, such as logical units numbered 140 and 150, which are not shown in the figure for the purpose of simplicity. The logical unit 130 together with more potential logical units may be collectively referred to as logical units in the storage system 100.

The thin logical unit 110 contains data 111-1, 111-2 . . . 111-N, which may be collectively referred to as data 111. The logical unit 130 includes slices 131-1, 131-2 . . . 131-N, which may be collectively referred to as a slice 131. The data 111 in the thin logical unit 110 is mapped (stored) to the slice 131 in the logical unit 130 by the virtual logical unit 120. In this process, the virtual logical unit 120 may map multiple pieces of data in the thin logical unit 110 to multiple slices in the logical unit 130, wherein the number of pieces of data may differ from the number of slices. According to embodiments of the present disclosure, the virtual logical unit 120 may include multiple objects, such as storage pool objects, file objects, slice manager objects and relocation objects (none of them is shown), wherein slice memory objects may be used to move slices. In some embodiments, the logical unit 130 may also be construed as being included in the virtual logical unit 120.

According to embodiments of the present disclosure, storage space in the thin logical unit 110 and the logical unit 130 may be referred to as address space or logical block address space (LBA address space). The address space may be used to determine a specific storage position in the storage space in the thin logical unit 110 and the logical unit 130.

It should be understood the device and/or arrangement shown in FIG. 1 is merely an example, rather than limiting the protection scope of the present disclosure.

Figure 2:
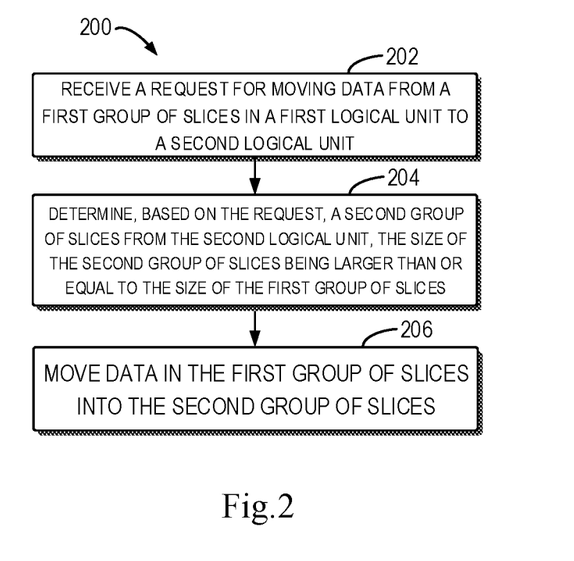
FIG. 2 shows a flowchart of a method 200 for processing data according to embodiments of the present disclosure.

FIG. 2 shows a flowchart of a method 200 for processing data according to embodiments of the present disclosure. The method 200 may be executed by, for example, the virtual logical unit 120 in the storage system 100. It should be understood the method 200 may further include an additional step which is not shown and/or may omit a step which is shown, and the scope of the present disclosure is not limited in this regard.

At block 202, the virtual logical unit 120 receives a request for moving data from a first group of slices in a first logical unit to a second logical unit. According to embodiments of the present disclosure, the first logical unit and the second logical unit may be the same or different logical units, and the first group of slices may include one or more slices.

At block 204, the virtual logical unit 120 determines a second group of slices from the second logical unit based on the received request, wherein the size of the second group of slices is larger than or equal to the size of the first group of slices. According to embodiments of the present disclosure, when determining the second group of slices from the second logical unit, it should be at least guaranteed that the determined second group of slices are enough to store data that used to be stored in the first group of slices, otherwise the process of moving data will fail. The size of the first group of slices may be specified by the received request, so that with the size, the second group of slices may be determined from the second logical unit.

At block 206, the virtual logical unit 120 moves data in the first group of slices into the determined second group of slices. According to some embodiments of the present disclosure, after data is moved to the second group of slices, the first group of slices no longer store the data. According to other embodiments of the present disclosure, after data is moved to the second group of slices, the first group of slices may still store the data. The protection scope of the present disclosure is not limited by the two scenarios.

As described above, the first logical unit and the second logical unit may be the same or different logical units. Description is presented below to these two cases with reference to FIGS. 3 and 4 respectively.

Figure 3:
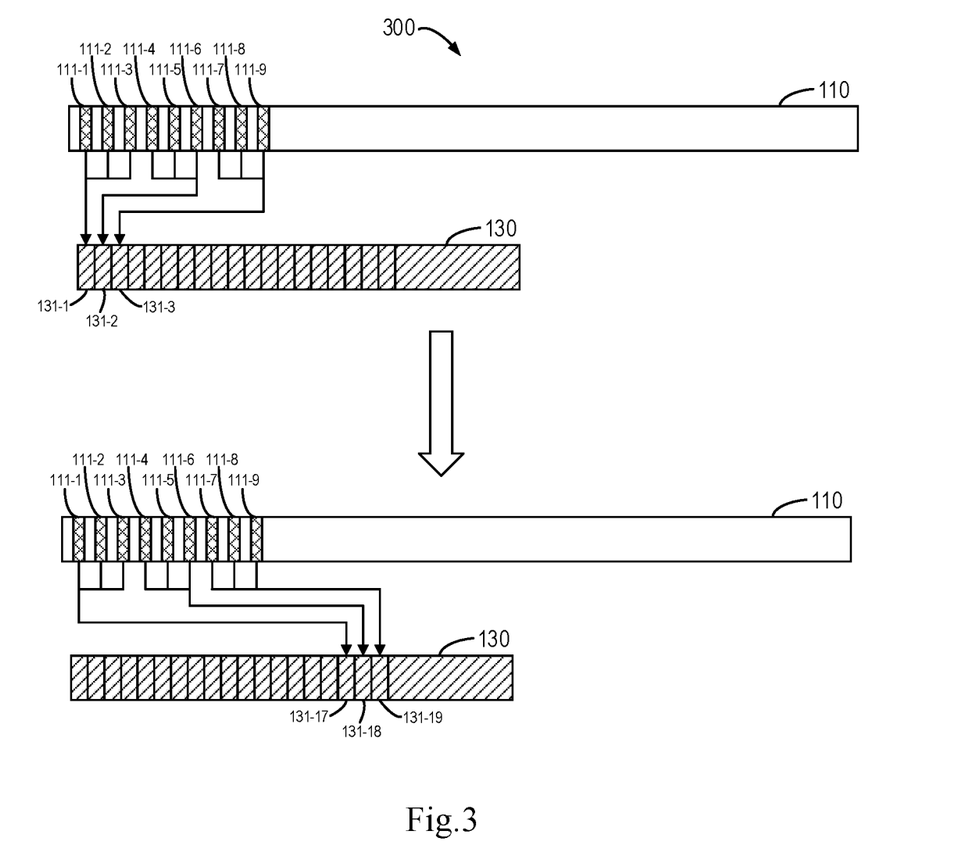
FIG. 3 shows a schematic view 300 of moving data in the same logical unit according to embodiments of the present disclosure.

FIG. 3 shows a schematic view 300 of moving data in the same logical unit according to embodiments of the present disclosure.

In the schematic view 300, there are shown two entities, i.e. the thin logical unit 110 and the logical unit 130. As depicted, the upper portion of FIG. 3 shows data storage situation before moving data, wherein multiple (9) pieces of data 111-1, 111-2 . . . 111-9 in the thin logical unit are mapped to multiple (3) slices 131-1, 131-2 and 131-3 in the logical unit 130. Specifically, the data 111-1, 111-2 and 111-3 is mapped to the slice 131-1, the data 111-4, 111-5 and 111-6 is mapped to the slice 131-2, and the data 111-7, 111-8 and 111-9 is mapped to the slice 131-3.

The lower portion of FIG. 3 shows data storage situation after moving data, wherein the data 111-1, 111-2 . . . 111-9 is mapped to slices 131-17, 131-18 and 131-19 in the logical unit 130, other than the slices 131-1, 131-2 and 131-3 that used to store data. Specifically, the data 111-1, 111-2 and 111-3 is mapped to the slice 131-17, the data 111-4, 111-5 and 111-6 is mapped to the slice 131-18, and the data 111-7, 111-8 and 111-9 is mapped to the slice 131-19.

As shown in FIG. 3, after moving data, the data 111-1, 111-2 . . . 111-9 is still mapped to the logical unit 130, but in different slices.

In the example shown in FIG. 3, the combined mapping mode of data does not change. For example, the data 111-1, 111-2 and 111-3 is mapped to the slice 131-1 before moving data and to the slice 131-17 after moving data, the data 111-4, 111-5 and 111-6 is mapped to the slice 131-2 before moving data and to the slice 131-18 after moving data, and the data 111-7, 111-8 and 111-9 is mapped to the slice 131-3 before moving data and to the slice 131-19 after moving data. It should be understood the case in which the combined mapping mode of data does not change is merely an example and does not limit the protection scope of the present disclosure. According to other embodiments of the present disclosure, the data 111-1, 111-2 . . . 111-9 may also be mapped to the slices 131-1, 131-2 and 131-3 in a combined mapping mode which is changed. For example, after moving data, the data 111-1 and 111-2 is mapped to the slice 131-1, the data 111-3, 111-4, 111-5 and 111-6 is mapped to the slice 131-2, and the data 111-7, 111-8 and 111-9 is still mapped to the slice 131-19.

Figure 4:
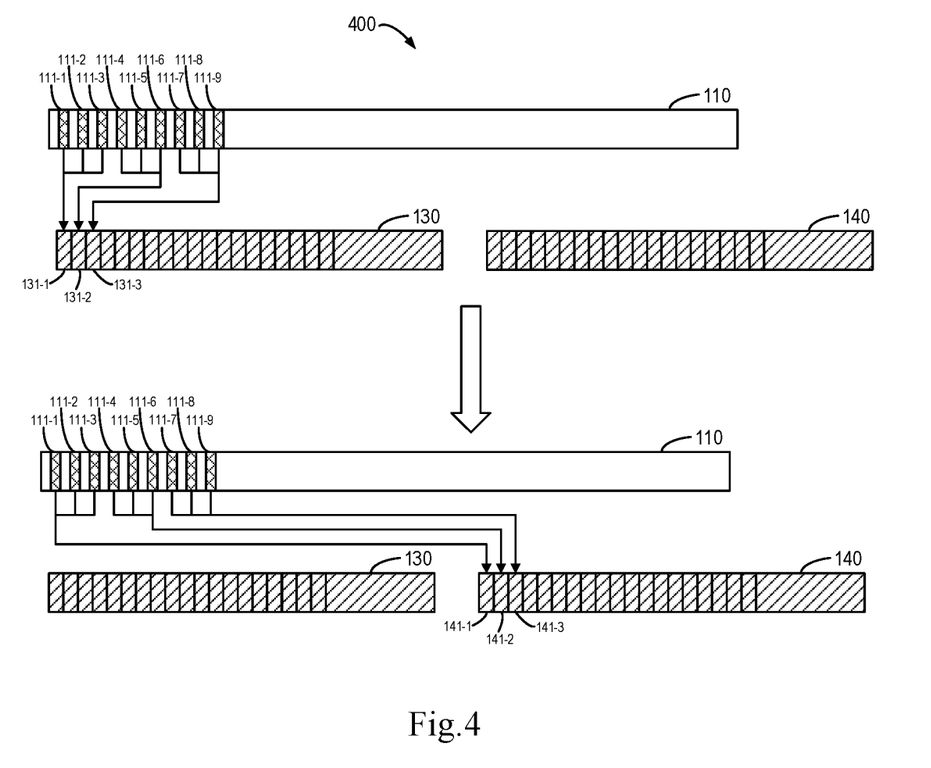
FIG. 4 shows a schematic view 400 of moving data between different logical units according to embodiments of the present disclosure.

FIG. 4 shows a schematic view 400 of moving data between different logical units according to embodiments of the present disclosure.

In the schematic view 400, there are shown three entities, i.e. the thin logical unit 110, the logical unit 130 and a logical unit 140. As depicted, the upper portion of FIG. 4 shows data storage situation before moving data, wherein multiple (9) pieces of data 111-1, 111-2 . . . 111-9 in the thin logical unit 110 are mapped to multiple (3) slices 131-1, 131-2 and 131-3 in the logical unit 130. Specifically, the data 111-1, 111-2 and 111-3 is mapped to the slice 131-1, the data 111-4, 111-5 and 111-6 is mapped to the slice 131-2, and the data 111-7, 111-8 and 111-9 is mapped to the slice 131-3.

The lower portion of FIG. 4 shows data storage situation after moving data, wherein the data 111-1, 111-2 . . . 111-9 is mapped to slices 141-1, 141-2 and 141-3 in the logical unit 140. Specifically, the data 111-1, 111-2 and 111-3 is mapped to the slice 141-1, the data 111-4, 111-5 and 111-6 is mapped to the slice 141-2, and the data 111-7, 111-8 and 111-9 is mapped to the slice 141-3.

As shown in FIG. 4, after moving data, the data 111-1, 111-2 . . . 111-9 is mapped to the logical unit 140 other than the logical unit 130 previously.

In the example shown in FIG. 4, the combined mapping mode of data does not change either. It should be understood the case in which the combined mapping mode of data does not change is merely an example and does not limit the protection scope of the present disclosure.

In addition, as shown in FIG. 4, the scenario in which the data 111-1, 111-2 . . . 111-9 is mapped from the logical unit 130 to the another logical unit 140 after moving data is also merely an example and does not limit the protection scope of the present disclosure. According to other embodiments of the present disclosure, after moving data, the data 111-1,1111-2 . . . 111-9 may also be mapped to the logical unit 140 and a further logical unit (e.g. with a numeral of 150) which is not shown. For example, the data 111-1, 111-2 and 111-3 is mapped to the slice 141-1, the data 111-4, 111-5 and 111-6 is mapped to the slice 141-2, and the data 111-7, 111-8 and 111-9 is mapped to a further slice (e.g. with a numeral of 151-1) in the further logical unit.

The method 200 for processing data as shown in FIG. 2 has been described in conjunction with FIGS. 3 and 4. According to embodiments of the present disclosure, blocks 204 and 206 in the flowchart of the method 200 for processing data shown in FIG. 2 may further be implemented as more detailed steps, which will be described in conjunction with FIG. 5.

Figure 5:
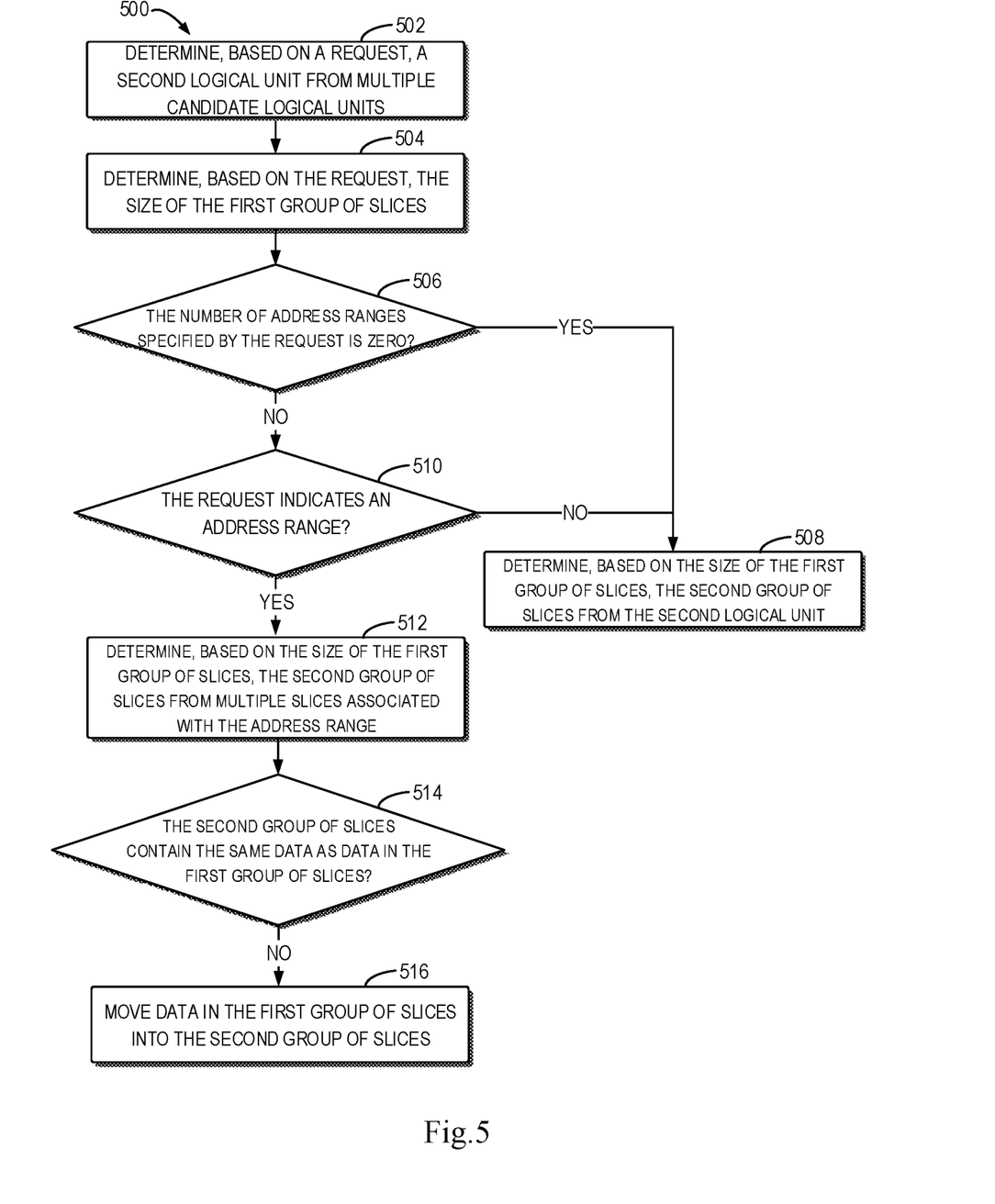
FIG. 5 shows a flowchart of a method 500 for processing data according to embodiments of the present disclosure.

FIG. 5 shows a flowchart of a method 500 for processing data according to embodiments of the present disclosure. The method 500 may also be executed by the virtual logical unit 120 in the storage system 100. It should be understood the method 500 may further include an additional step which is not shown and/or may omit a step which is shown, and the scope of the present disclosure is not limited in this regard.

At block 502, the virtual logical unit 120 determines a second logical unit from multiple candidate logical units based on a received request. According to some embodiments of the present disclosure, the storage system 100 may include multiple logical units. At this point, the request may specify a logical unit to which data will be moved. According to other embodiments of the present disclosure, the storage system 100 includes only one logical unit, or the storage system 100 includes multiple logical units, but a logical unit to which data will be moved is set in advance. At this point, the request does not need to specify to which logical unit data will be moved. Therefore, block 502 is not essential, and its presence or absence will not affect the implementation of the technical solution of the present disclosure. At block 504, the virtual logical unit 120 determines the size of a first group of slices. As described with reference to block 204 in FIG. 2, according to embodiments of the present disclosure, when determining a second group of slices from the second logical unit, it should be at least guaranteed that the determined second group of slices are enough to store data that used to be stored in the first group of slices, otherwise the process of moving data will fail. Therefore, the size of the first group of slices may be specified by the received request, so that with the size, the second group of slices may be determined from the second logical unit.

At block 506, the virtual logical unit 120 determines whether the number of address ranges in the second logical unit as specified by the received request is zero or not. According to embodiments of the present disclosure, the request may specify multiple address ranges and may specify the number of address ranges. When the virtual logical unit 120 determines at block 506 that the number of address ranges specified by the received request is zero, this means the received request does not actually require to determine in the specified address range slices which are used for storing data, or this means the received request does not specify a specific address range. At this point, the flow of the method 500 proceeds to block 508. When the virtual logical unit 120 determines at block 506 that the number of address ranges specified by the received request is not zero, the flow of the method 500 proceeds to block 510.

At block 508, since the received request does not actually require to determine in the specified address range slices which are used for storing data, or does not specify a specific address range, the virtual logical unit 120 determines, based on the size of the first group of slices, the second group of slices from the second logical unit. As described above, in order to avoid the failure of the data moving process, the virtual logical unit 120 needs to determine, based on the size of the first group of slices, the second group of slices, and the size of the second group of slices should be larger than or equal to the size of the first group of slices.

According to some embodiments of the present disclosure, when determining the second group of slices, the virtual logical unit 120 may be not only based on the size of the first group of slices but also based on other information.

For example, the virtual logical unit 120 may further determine the second group of slices from the second logical unit based on at least one of the performance of required target slices which are preset or specified by the received request, a group of Redundant Arrays of Independent group Disks (RAID) associated with the required target slices and a storage processor associated with the required target slices. It should be understood the virtual logical unit 120 may be based on more or less information than enumerated above, and the above information is enumerated merely as examples rather than limiting the protection scope of the present disclosure.

At block 510, the virtual logical unit 120 determines whether the received request specifies an address range associated with multiple slices in the second logical unit. When the virtual logical unit 120 determines at block 510 that the received request specifies an address range, the flow of the method 500 proceeds to block 512. If the virtual logical unit 120 determines at block 510 that the received request does not specify any address range, the flow of the method 500 proceeds to block 508. A step after proceeding to block 508 from block 510 is the same as the step after processing to block 508 from block 506, which is not detailed here.

At block 512, the virtual logical unit 120 determines, based on the size of the first group of slices, the second group of slices from multiple slices associated with the specified address range. According to embodiments of the present disclosure, when the received request specifies an address range, the virtual logical unit 120 determines the second group of slices only from the specified address range instead of other positions in storage space of the second logical unit.

At block 514, after the virtual logical unit 120 determines the second group of slices at block 512, the virtual logical unit 120 determines whether the second group of slices contain the same data as to-be-moved data in the first group of slices. According to embodiments of the present disclosure, since an overdue system update might occur in the storage system 100, it is possible that data in the first group of slices is already moved to the second group of slices, but the storage system 100 does not update this message in time and require to move data to the second group of slices. At this point, in order to avoid an error in moving data, it should be judged whether data has been moved to the second group of slices. When the virtual logical unit 120 determines the second group of slices do not contain the same data as to-be-moved data in the first group of slices, the flow of the method 500 proceeds to block 516, otherwise the flow will exit or an error will be reported.

According to some embodiments of the present disclosure, when determining whether the second group of slices contain the same data as to-be-moved data in the first group of slices, the virtual logical unit 120 may obtain an identifier associated with data in the first group of slices from the received request, e.g. file system object ID (FS_OID). At this point, the virtual logical unit 120 may determine whether the second group of slices contain data associated with the obtained identifier, thereby determining whether the second group of slices already contain the same data as to-be-moved data in the first group of slices. It should be understood there exist multiple ways to determine data duplication or not. The above way is merely an example and not limiting the protection scope of the present disclosure.

At block 516, the virtual logical unit 120 moves data in the first group of slices into the second group of slices.

It should be understood the number of each element and the value a physical quantity in the above figures are merely examples and not limiting the protection scope of the present disclosure. The number and value may be set according to needs, without any impact on the normal implementation of embodiments of the present disclosure.

With reference to FIGS. 2 to 5, description has been presented above to flows and contents of the methods 200 and 500 for processing data. It should be understood the above description is provided for better demonstrating contents of the present disclosure, rather than limiting in any way.

Embodiments of the present disclosure may be implemented via changes in an interface, state machine and data structure associated with the storage system 100, especially the virtual logical unit 120.

According to embodiments of the present disclosure, changes in the interface associated with the virtual logical unit 120 may include changes in an interface (start interface) associated with starting slice relocation process and an interface (set interface) associated with setting relocation slice information. The start interface requests to specify a relocation process and returns the identifier of a relocation object which is used for relocation, and set interface internally sets information associated with slices after the relocation object is created and waits relocation work to proceed.

According to embodiments of the present disclosure, the start interface may support operations of determining whether the number of specified address ranges is zero and determining whether data to be moved duplicates, as involved at blocks 506 and 514 in the method 500 described with reference to FIG. 5.

According to embodiments of the present disclosure, the set interface may support to modify properties associated with specified relocation slices, for example, may support to specify address ranges in a logical unit from which data will be moved and the number of address ranges, wherein the maximum number of address ranges may be related to the size of persistent data in a relocation object, because a larger number will lead to a larger size of persistent data. The set interface may further be used to support the operation involved at block 508 in the method 500 described with reference to FIG. 5.

According to embodiments of the present disclosure, changes in the state machine associated with the virtual logical unit 120 is mainly related to changes in an added new state, such as GoToNewSliceAllocated. This will lead to changes in the logic in a state associated with an unchanged state machine of the virtual logical unit 120, thereby achieving changes in an operational state associated with the flows of the methods 200 and 500 for processing data described with reference to FIGS. 2 and 5 respectively.

According to embodiments of the present disclosure, changes in the data structure associated with the virtual logical unit 120 include MLU_RELOCATEOBJ_PREFERRED_DESTINATION which needs to be added in the data structure of a relocation object in order to support selecting a slice in a specified address range of a specified logical unit. MLU_RELOCATEOBJ_PREFERRED_DESTINATION may be defined as below:

```
typedef struct _MLU_RELOCATEOBJ_PERSISTENT_DATA
{
MLU_OBJECT_ID                          FSObjectId;
MLU_SLICE_RELOCATION_SLICE_ID            OldSlice;
MLU_SLICE_RELOCATION_SLICE_ID            NewSlice;
MLU_RELOCATEOBJ_STATUS                 RelocationStatus;
ULONG32                                MinimumPerformanceEstimate;
ULONG32                                MaximumPerformanceEstimate;
ULONG64                                RaidGroup;
K10TM_SPID                             AllocationSp;
ULONG32                                ThrottleRate;
MLU_SLICE_CBFS_PRIVATE_INFO              CbfsInfo;
BOOLEAN                                ForceCommit;
BOOLEAN                                IsInsured;
MLU_SLICE_RELOCATION_INITIATOR_TYPE     RelocationInitiator;
QoS_t                        Qos;
MLU_RELOCATEOBJ_PREFERRED_DESTINATION
PreferredDestination; //new added
}                                  MLU_RELOCATEOBJ_PERSISTENT_DATA,
*PMLU_RELOCATEOBJ_PERSISTENT_DATA;
typedef struct MLU_RELOCATEOBJ_PREFERRED_DESTINATION
{
   MLU_DEVICE_ID       DeviceID;      // LU Device ID
   ULONG32      NumRanges;       // number of Address Ranges
   MLU_RELOCATEOBJ_RANGERanges
     [MLU_RELOCATEOBJ_MAX_RANGES_IN_PREFERRED_DESTINATION];
}MLU_RELOCATEOBJ_PREFERRED_DESTINATION
typedef struct _MLU_RELOCATEOBJ_RANGE
{
   ULONG64 OffsetInSectors; // offset in sectors (512B)
   ULONG64 LengthInSectors; // length in sectors (512B)
   }MLU_RELOCATEOBJ_RANGE;
```

As seen from the above description with reference to FIGS. 1 to 5, the technical solution according to embodiments of the present disclosure has many advantages over the traditional solution. For example, with the present solution, data may be moved to slices in a specified address range in a specified logical unit, wherein the address range is defined as start offset and length of the address range in the logical unit. Besides, with the present solution, data may be moved to appropriate slices in a target logical unit when data cannot be moved to slices in a specific address range because an address range is not specified or a specified address range is unavailable. In this process, consideration may be given to the performance of required target slices, a group of Redundant Arrays of Independent Disks (RAID) group associated with the required target slices and a storage processor (SPs) associated with the required target slices. In addition, with the present solution, a Redundant Array of Multi-Core Disks (MCR) can move disk extents (DEs) and redistribute IOs between disk extents, which may be implemented by moving data in slices between rotation groups in a logical unit.

Figure 6:
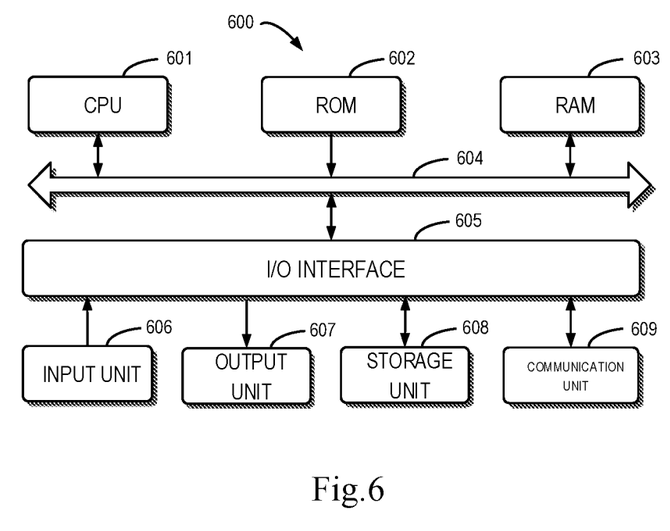
FIG. 6 shows a schematic block diagram of an example device 600 which is applicable to implement embodiments of the present disclosure.

FIG. 6 shows a schematic block diagram of an example device 600 suitable for implementing embodiments of the present disclosure. As depicted, the device 600 includes a central processing unit (CPU) 601 which is capable of performing various appropriate actions and processes in accordance with computer program instructions stored in a read only memory (ROM) 602 or computer program instructions loaded from a storage unit 608 to a random access memory (RAM) 603. In the RAM 603, there are also stored various programs and data required by the device 600 when operating. The CPU 601, the ROM 602 and the RAM 603 are connected to one another via a bus 604. An input/output (I/O) interface 605 is also connected to the bus 604.

Multiple components in the device 600 are connected to the I/O interface 605: an input unit 606 including a keyboard, a mouse, or the like; an output unit 607, such as various types of displays, a loudspeaker or the like; a storage unit 608, such as a disk, an optical disk or the like; and a communication unit 609, such as a LAN card, a modem, a wireless communication transceiver or the like. The communication unit 609 allows the device 600 to exchange information/data with other device via a computer network, such as the Internet, and/or various telecommunication networks.

The above-described procedures and processes (such as the methods 200 and 300) may be executed by the processing unit 601. For example, in some embodiments, the methods 200 and 300 may be implemented as a computer software program, which is tangibly embodied on a machine readable medium, e.g. the storage unit 608. In some embodiments, part or the entirety of the computer program may be loaded to and/or installed on the device 600 via the ROM 602 and/or the communication unit 609. The computer program, when loaded to the RAM 603 and executed by the CPU 601, may execute one or more acts of the methods 200 and 300 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method for processing data, the method comprising:
    receiving a request for moving data from a first group of slices in a first logical unit to a second logical unit;
    determining, based on the request, a second group of slices from the second logical unit, the size of the second group of slices being larger than or equal to the size of the first group of slices; and
    moving data in the first group of slices into the second group of slices;
    wherein determining the second group of slices comprises:

determining, based on the request, the size of the first group of slices;
determining that the request does not specify an address range associated with multiple slices in the second logical unit; and
in response to determining that the request does not specify the address range, determining, based on the size of the first group of slices, the second group of slices from the second logical unit.

2. The method according to claim 1, wherein moving data in the first group of slices into the second group of slices comprises:
determining whether the second group of slices contain the same data as the data; and
in response to determining that the second group of slices do not contain the same data, moving the data in the first group of slices into the second group of slices.

3. The method according to claim 2, wherein determining whether the second group of slices contain the same data as the data comprises:
obtaining, from the request, an identifier associated with the data; and
determining whether the second group of slices contain data associated with the identifier.

4. The method according to claim 1, further comprising:
determining, based on the request, the second logical unit from multiple candidate logical units.

5. The method according to claim 1, wherein determination of the second group of slices is further based on at least one of:
performance associated with the second group of slices;
a Redundant Array of Independent Disks group associated with the second group of slices; and
a storage processor associated with the second group of slices.

6. A method for processing data, the method comprising:
receiving a request for moving data from a first group of slices in a first logical unit to a second logical unit;
determining, based on the request, a second group of slices from the second logical unit, the size of the second group of slices being larger than or equal to the size of the first group of slices; and
moving data in the first group of slices into the second group of slices;
wherein determining the second group of slices comprises:
determining, based on the request, the size of the first group of slices;
determining that a number of address ranges specified by the request is zero; and
in response to determining that the number of address ranges specified by the request is zero, determining, based on the size of the first group of slices, the second group of slices from the second logical unit.

7. The method according to claim 6,
wherein determination of the second group of slices is further based on at least one of:
performance associated with the second group of slices;
a Redundant Array of Independent Disks group associated with the second group of slices; and
a storage processor associated with the second group of slices.

8. A device for processing data, comprising:
at least one processing unit;
at least one memory, coupled to the at least one processing unit and storing instructions executed by the at least one processing unit, the instructions, when executed by the at least one processing unit, causing the device to perform acts, including:
receiving a request for moving data from a first group of slices in a first logical unit to a second logical unit;
determining, based on the request, a second group of slices from the second logical unit, the size of the second group of slices being larger than or equal to the size of the first group of slices; and
moving data in the first group of slices into the second group of slices;
wherein determining the second group of slices comprises:
determining, based on the request, the size of the first group of slices;
determining whether the request specifies an address range associated with multiple slices in the second logical unit; and
in response to determining that the request specifies the address range, determining, based on the size of the first group of slices, the second group of slices from the multiple slices; and
in response to determining that the request does not specify the address range, determining, based on the size of the first group of slices, the second group of slices from the second logical unit.

9. The device according to claim 8,
wherein determination of the second group of slices is further based on at least one of:
performance associated with the second group of slices;
a Redundant Array of Independent Disks group associated with the second group of slices; and
a storage processor associated with the second group of slices.

10. The device according to claim 8, wherein moving data in the first group of slices into the second group of slices comprises:
determining whether the second group of slices contain the same data as the data; and
in response to determining that the second group of slices do not contain the same data, moving the data in the first group of slices into the second group of slices.

11. The device according to claim 10, wherein determining whether the second group of slices contain the same data as the data comprises:
obtaining, from the request, an identifier associated with the data; and
determining whether the second group of slices contain data associated with the identifier.

12. The device according to claim 8, wherein the acts further comprise:
determining, based on the request, the second logical unit from multiple candidate logical units.

13. A device for processing data, comprising:
at least one processing unit;
at least one memory, coupled to the at least one processing unit and storing instructions executed by the at least one processing unit, the instructions, when executed by the at least one processing unit, causing the device to perform acts, including:
receiving a request for moving data from a first group of slices in a first logical unit to a second logical unit;
determining, based on the request, a second group of slices from the second logical unit, the size of the second group of slices being larger than or equal to the size of the first group of slices; and moving data in the first group of slices into the second group of slices;
wherein determining the second group of slices comprises:
  determining, based on the request, the size of the first group of slices;
  determining whether the request specifies an address range associated with multiple slices in the second logical unit; and
  in response to determining that the request specifies the address range, determining, based on the size of the first group of slices, the second group of slices from the multiple slices; and
  in response to determining that the number of address ranges specified by the request is zero, determining, based on the size of the first group of slices, the second group of slices from the second logical unit.

14. The device according to claim 13, wherein determination of the second group of slices is further based on at least one of:
  performance associated with the second group of slices;
  a Redundant Array of Independent Disks group associated with the second group of slices; and
  a storage processor associated with the second group of slices.

15. A computer program product having a non-transitory computer readable medium which stores a set of instructions to process data; the set of instructions, when carried out by computerized circuitry, causing the computerized circuitry to perform a method of:
  receiving a request for moving data from a first group of slices in a first logical unit to a second logical unit;
  determining, based on the request, a second group of slices from the second logical unit, the size of the second group of slices being larger than or equal to the size of the first group of slices; and
  moving data in the first group of slices into the second group of slices;
  wherein determining the second group of slices comprises:
    determining, based on the request, the size of the first group of slices;
    determining whether the request specifies an address range associated with multiple slices in the second logical unit; and
    in response to determining that the request specifies the address range, determining, based on the size of the first group of slices, the second group of slices from the multiple slices; and
    in response to determining that the request does not specify the address range, determining, based on the size of the first group of slices, the second group of slices from the second logical unit.

16. The computer program product according to claim 15, wherein moving data in the first group of slices into the second group of slices comprises:
  determining whether the second group of slices contain the same data as the data; and
  in response to determining that the second group of slices do not contain the same data, moving the data in the first group of slices into the second group of slices.

17. The computer program product according to claim 16, wherein determining whether the second group of slices contain the same data as the data comprises:
  obtaining, from the request, an identifier associated with the data; and
  determining whether the second group of slices contain data associated with the identifier.

18. The computer program product according to claim 15, further comprising:
  determining, based on the request, the second logical unit from multiple candidate logical units.

19. The computer program product according to claim 15, wherein determination of the second group of slices is further based on at least one of:
  performance associated with the second group of slices;
  a Redundant Array of Independent Disks group associated with the second group of slices; and
  a storage processor associated with the second group of slices.

* * * * *